United States Patent
Osterberg

(10) Patent No.: US 7,093,806 B2
(45) Date of Patent: Aug. 22, 2006

(54) METHOD AND SYSTEM FOR DECOUPLING STRUCTURAL MODES TO PROVIDE CONSISTENT CONTROL SYSTEM PERFORMANCE

(75) Inventor: David A. Osterberg, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/851,975

(22) Filed: May 20, 2004

(65) Prior Publication Data

US 2004/0245403 A1    Dec. 9, 2004

Related U.S. Application Data

(62) Division of application No. 10/189,860, filed on Jul. 3, 2002, now Pat. No. 6,834,841.

(51) Int. Cl.
*F16M 1/00* (2006.01)
(52) U.S. Cl. .................. 244/173.2; 248/550; 248/605; 248/638; 267/136; 267/140.15; 188/266
(58) Field of Classification Search ............... 248/605, 248/638, 550; 267/136, 140.14, 140.15; 188/266, 290; 244/164, 173.2
See application file for complete search history.

(56) References Cited

U.S. PATENT DOCUMENTS 5,427,347 A * 6/1995 Swanson et al. ....... 267/140.14
6,000,703 A * 12/1999 Schubert et al. ......... 280/5.518
6,193,206 B1 * 2/2001 Yasuda et al. .............. 248/550
6,626,411 B1 * 9/2003 Houghton et al. .......... 248/550
6,825,635 B1 * 11/2004 Kato .......................... 318/649

\* cited by examiner

*Primary Examiner*—J. Woodrow Eldred
(74) *Attorney, Agent, or Firm*—Ingrassia Fisher & Lorenz

(57) ABSTRACT

A method and system for calculating a control function for a structural system (10) that can be used to determine an appropriate control force to apply to an active member (18) within a stationary member (12) on the structural system (10). An active member (18) and a stationary member (12) are defined as a two-mass system in which the active member (18) and the stationary member (12) move in opposite directions. The stationary member (12) is mounted to an isolation subsystem (14) that is composed of six isolators (28) at multiple degrees of freedom. The isolation subsystem (14) is softer than the stationary member (12), active member (18) and a spacecraft surface (16) due to a damping element (32) of the isolation subsystem (16). The isolation subsystem (16) is mounted to the spacecraft (16) and decouples the spacecraft (16) from the stationary member (12) and thus the active member (18). An accurate control force for the active member (18) can be determined based upon the above structure (10).

7 Claims, 5 Drawing Sheets

METHOD AND SYSTEM FOR DECOUPLING STRUCTURAL MODES TO PROVIDE CONSISTENT CONTROL SYSTEM PERFORMANCE

CROSS-REFERENCE TO RELATED APPLICATIONS

This application is a divisional of and claims priority to U.S. patent application Ser. No. 10/189,860, filed on Jul. 3, 2002, now U.S. Pat. No. 6,834,841 which is hereby incorporated by reference.

FIELD OF THE INVENTION

The present invention relates generally to methods and systems for consistently controlling system dynamics, and more particularly to a method and system for consistently controlling an active member connected to a spacecraft by decoupling the active member from the spacecraft.

DESCRIPTION OF THE RELATED ART

Conventional methods for modeling active subsystems for spacecraft, such as a reaction wheel subsystem, involve modeling the system as two masses in which a first mass is a moving mass, the second mass is assumed to be ground, and an active control system controls the moving mass. For example, the first mass could be a levitated rotor and the second mass could be the rotor housing stiffly connected to the spacecraft. However, a problem can occur in the actual hardware of the control system when the spacecraft is not infinitely stiff or an infinite mass. This can cause instability in the controls and is undesirable.

This problem often occurs when an actuator commands an electromagnet to push (or pull) between a suspended rotor and a stationary housing to effect levitation. Accurate knowledge of the dynamics and mass properties of the levitated rotor and stationary housing as well as the spacecraft to which the stationary housing is attached is necessary to ensure control stability. However, the dynamics of the spacecraft model rarely fully converge to the dynamics of an actual spacecraft. Even if the dynamics of the spacecraft model are within the tolerance range of the actual spacecraft, a control system designed to operate correctly when bolted to one spacecraft may not operate correctly when bolted to another. In addition, the rotor within the suspended housing can transfer disturbance forces to the spacecraft. Such disturbance forces can hinder the control stability of the rotor within the suspended housing as well as input undesirable vibrations to the spacecraft.

The above-discussed problems are not limited to electromagnets. The disturbance forces and limited control stability can occur in other active control systems where mounting structures beyond the actual stationary housing and rotor may cause stability problems. This can occur when a structural modes and/or spacecraft related disturbances fall within the bandwidth of the control system. As a result, the conventional methods for modeling space structural systems and determining an actuator control system must account for structural (model) characteristics of a variety of spacecraft in determining the force of an actuator and the control loop for the actuator must be designed to react to low frequency disturbances (from the rotor) while not reacting to the higher frequency disturbances (from the spacecraft).

SUMMARY OF THE INVENTION

In view of the above, the present invention provides a method for estimating the dynamics of an active subsystem and determining a control force for the active subsystem by decoupling the active subsystem from a mounting surface (surface). A structural system is modeled as an active subsystem mounted to an isolation subsystem that decouples the active subsystem from a surface. The isolation subsystem decouples the active subsystem by a plurality (preferably six) of soft highly-damped isolators that connect the active subsystem to the surface and that provide highly damped isolation in a plurality (preferably six) of degrees of freedom. A control loop (in, for example, a microcomputer) commands the actuator to apply a control force to an active member within the active subsystem in order to maintain it at a specific bearing gap. The control force is determined based upon transfer functions of the active and passive subsystem, without having to take into account the dynamics of the surface. An actual structural system can subsequently be designed based upon the control force.

In a second embodiment, the active subsystem is modeled as an array of interconnected stationary housings. The interconnecting of the stationary housings provides more mass for the actuators to push against for maintaining the active members at the bearing gap within the active subsystem.

The present invention consequently enables an appropriate control force to be determined for application to an active member within a stationary housing without having to take into account the dynamic characteristics of the mounting surface.

BRIEF DESCRIPTION OF THE DRAWINGS

Objects and advantages of the present invention will be more readily apparent from the following detailed description of the preferred embodiments thereof when taken together with the accompanying drawings in which.

DETAILED DESCRIPTION OF THE PREFERRED EMBODIMENTS

In overview form the present disclosure concerns structural systems designed for space travel. Examples of such systems include spacecraft that carry rotor housings. As further discussed below various inventive principles and combinations thereof are advantageously employed to determine a control vector force to be applied by an actuator within the rotor housing and to decouple the rotor housing from the spacecraft.

The instant disclosure is provided to further explain in an enabling fashion the best modes of performing the embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts in accordance with the present invention.

Figure 1:
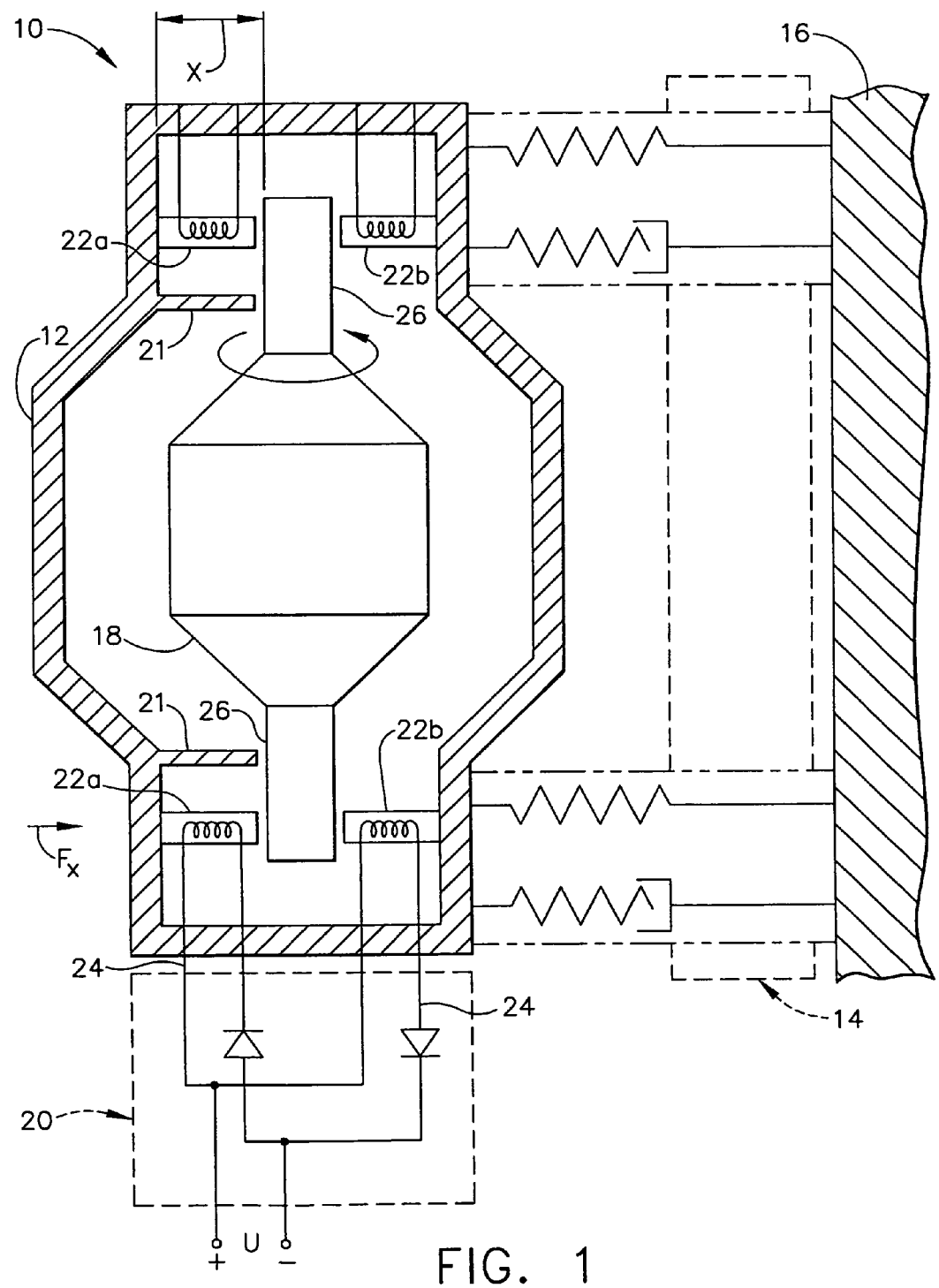
FIG. 1 is an exemplary view of a first embodiment of the present invention in which a single stationary housing with an active member is mounted on a surface via an isolation subsystem.

The present disclosure will discuss various embodiments in accordance with the invention. The system diagrams of FIGS. 1–4 will be used to lay the groundwork for a deeper understanding of the present invention and advantages thereof. FIG. 1 in large part and at the simplified level depicted is a representative diagram of a structural system (system) 10 and will serve to explain the problems and certain inventive solutions thereto according to the present invention.

Referring now to the drawings in which like numerals reference like items, FIG. 1 shows an exemplary system 10 in which a first embodiment of the present invention is implemented. Specifically, the system 10 includes a stationary housing 12, an isolation subsystem 14 and a mounting surface such as, for example, a spacecraft surface 16. The isolation subsystem 14 mounts the stationary housing 12 to the spacecraft surface 16. The stationary housing 12 and the isolation subsystem 14 will be discussed in detail below.

The stationary housing 12 includes an active member 18 within the stationary housing 12, a control member 20 for controlling the active member 18 and at least one bearing gap sensor 21. The active member 18 may be, for example, a rotor 18 that is magnetically levitated to a predetermined position within the stationary housing 12. The control member 20 may be, for example, an actuator 20 that controls a set of electromagnets 22a, 22b. The rotor 18 is positioned a predetermined distance within the stationary housing 12. This predetermined distance is referred to as a bearing gap x. Structural modes or random disturbances from the spacecraft often cause the rotor 18 to become displaced from the bearing gap x. The bearing gap sensor 21 measures the position of the rotor 18. The actuator 20 maintains the rotor 18 at the bearing gap x by applying a control vector force u to the electromagnets 22a, 22b. A control device (not shown) such as, for example, a microcomputer or analog control device including a closed loop control commands the actuator 20. If the bearing gap sensor 21 determines that the rotor 18 is displaced from the bearing gap, the electromagnets 22a, 22b can increase the control force based on the measurement of the bearing gap. More specifically, the actuator 20 applies a current to the electromagnets 22a through wire coils 24. Each of the electromagnets 22 pulls on an iron trunnion 26 of the rotor 18 at a plurality of degrees of freedom with the control vector force u to maintain the rotor 18 at the bearing gap, if the current is positive. The electromagnets 22b pull on the iron trunnion 26 in a similar manner if the current is negative. For example, in FIG. 1, the electromagnets 22 apply forces in the x direction (Fx) for maintaining the rotor 18 at the bearing gap x.

Figure 2:
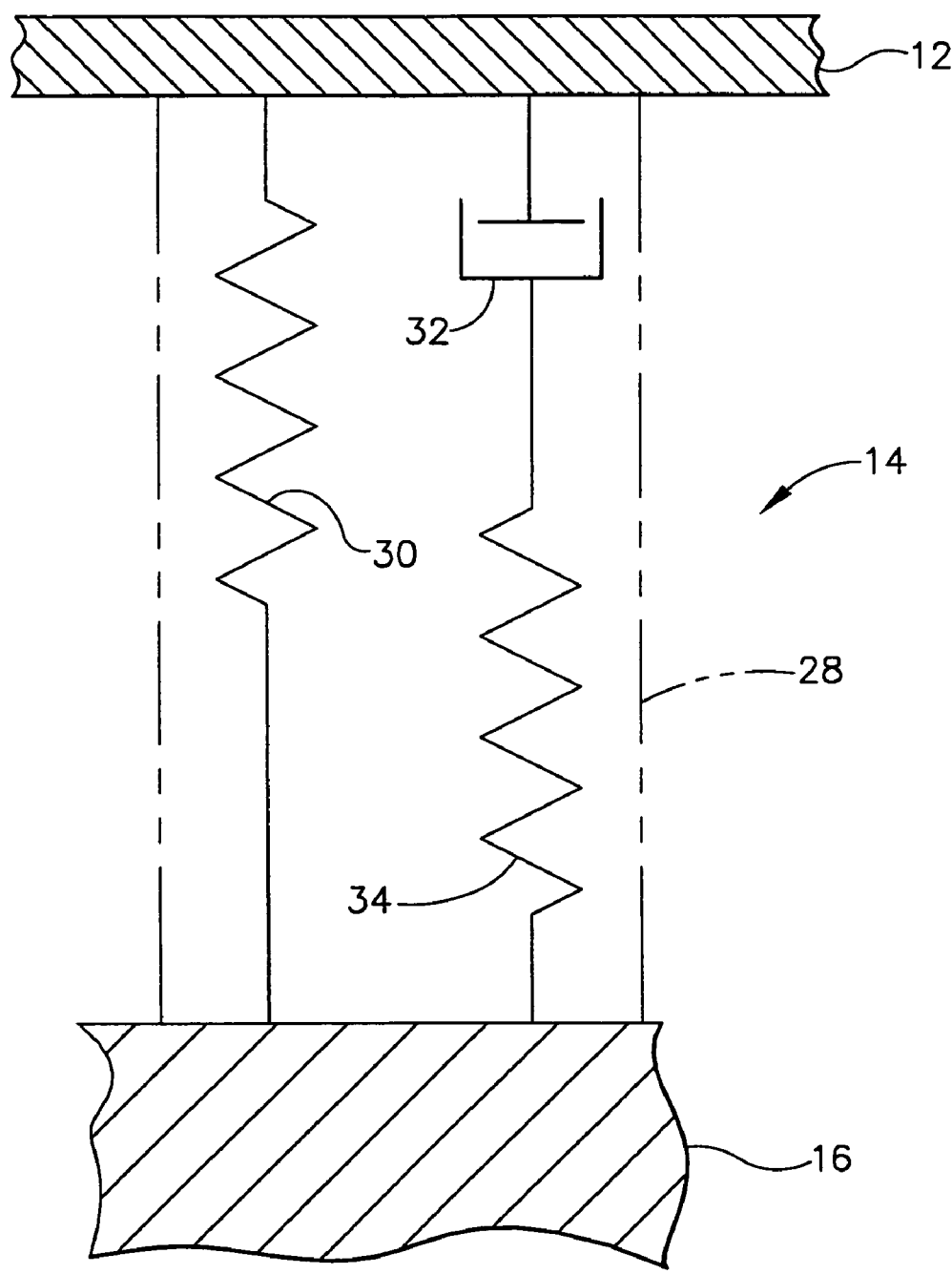
FIG. 2 is an exemplary view of a D-strut® isolator within the isolation subsystem.

Referring to FIG. 2, the isolation subsystem 14 mounts the stationary housing 12 to the spacecraft surface 16, and is secured to both the stationary housing 12 and the spacecraft surface 16 by, for example, bolts (not shown). The isolation subsystem 14 includes a plurality of isolators 28, each at a respective degree of freedom between the stationary housing 12 and the spacecraft surface 16. Preferably, the isolation subsystem 14 includes at least six isolators 28. Only one isolator 28 is shown in FIG. 2 for ease of illustration. The isolator 28 is preferably a D-strut® that is disclosed in U.S. Pat. No. 5,332,070, which is hereby incorporated by reference. Other isolators, such as springs, may be utilized. However, the D-strut® provides faster roll off and higher damping. The D-strut® isolator 28 includes a primary spring 30 in parallel with a series damper element 32 and secondary stiffness element 34. The spring element 30 makes the isolator 28 softer than the stationary housing 12 and the spacecraft surface 16. The softness of the isolator 28 prevents communication of spacecraft structural modes and reduces disturbance forces from the stationary housing 12 and the rotor 18 from reaching the spacecraft surface 16. Such disturbance forces can cause jitter, image blurring (when, for example, the spacecraft is carrying an optics payload), or can excite lightly damped structural modes on the spacecraft if the disturbance forces reach the spacecraft surface 16. However, the spacecraft has to communicate attitude control forces to the actuator 20 to maintain the spacecraft at a certain attitude. These attitude control forces occur at relatively lower frequencies than the disturbance forces. The primary spring 30 and the secondary stiffness element 34 maintain the isolators 28 at a level of stiffness sufficient to permit communication of the low frequency attitude control forces while the damper element 32 provides enough softness to prevent communication of the high frequency disturbance forces.

The isolation subsystem 14 also prevents spacecraft disturbance forces from contributing to the displacement of the rotor 18 within the stationary housing 12 if the structural modes of the spacecraft are greater than those in the isolation subsystem 14. As a result, the control vector force u applied by the electromagnets 22 can be determined without having to take into account the structural response of the of the spacecraft surface 16 to the rotor control forces. The relationship between the control vector force (u), the velocity of displacement of the bearing gap (y), the transfer function of the rotor 18 ($Y^R_y$), and the transfer function of the stationary housing 12 ($Y^H_y$) is shown by formula (1):

$$y/u = -\Sigma Y^R_y + \Sigma Y^H_y \tag{1}$$

The transfer functions of the rotor $Y^R_y$ and the stationary housing $Y^H_y$ can be determined by process testing. For example, a test force F could be applied to the rotor 18 and to the stationary housing 12 by a vibration driver at points in which they interface with the bearings 22, and by detecting a velocity of the rotor $V_R$ and the stationary housing $V_H$ by a vibration sensor in response to the test force. The relationship between the velocity and the test force is shown by formulas (2) and (3).

$$Y^R_y = F/V_R \quad (2)$$

$$Y^H_y = F/V_H \quad (3)$$

As shown by formula (1), the transfer functions of the isolation subsystem 14 and the spacecraft surface 16 do not affect the bearing gap velocity or the control vector force that is needed to correct the bearing gap velocity. Specifically, the isolation subsystem 14 decouples the spacecraft surface 16 from the stationary housing 12. As a result, a model for the stationary housing 14 and the rotor 12 can be utilized to accurately determine the actuator 20 and control force that is needed without having to take into account the transfer functions of the spacecraft surface 16 or isolation subsystem 14.

Figure 3:
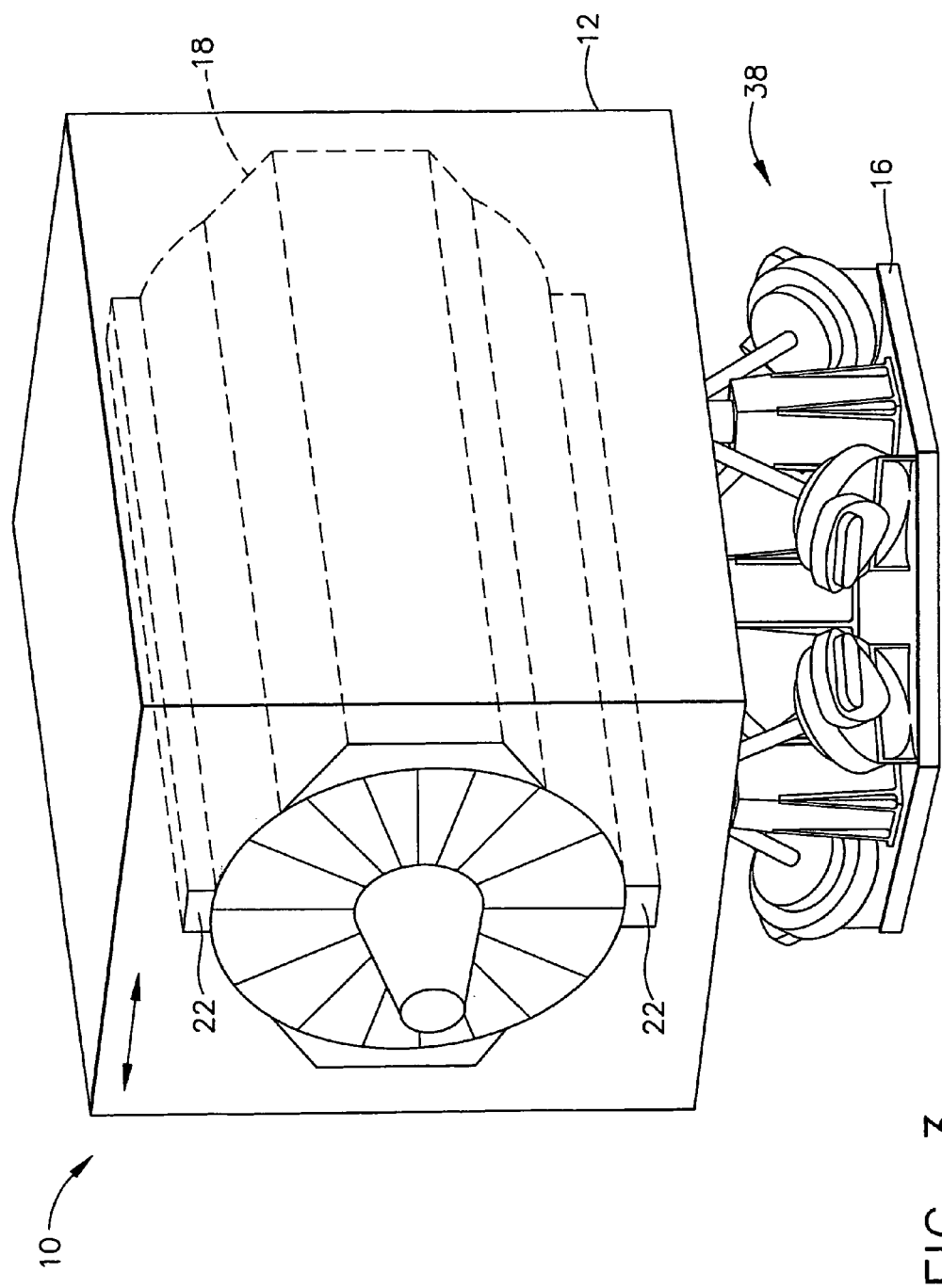
FIG. 3 is an exemplary view of the first embodiment of the present invention in which the single stationary housing is mounted on the surface via a hexapod of hybrid D-strut® isolators.

Referring now to FIG. 3, the stationary housing 12 may alternatively be mounted to the spacecraft surface 16 via a hexapod of hybrid D-struts® 38. The hybrid D-strut® is disclosed in U.S. Pat. No. 6,003,849 and is incorporated herein by reference. The hexapod of hybrid D-struts® 38 mounts the stationary housing 12 to the spacecraft surface 16 at six degrees of freedom via six hybrid D-struts 39. Each hybrid D-strut® 39 includes voice coils on the stroke with an open loop feed forward control. The voice coils can be commanded to communicate the attitude force from spacecraft surface 16 to the stationary housing 12 if the attitude of the spacecraft must be adjusted.

Figure 4:
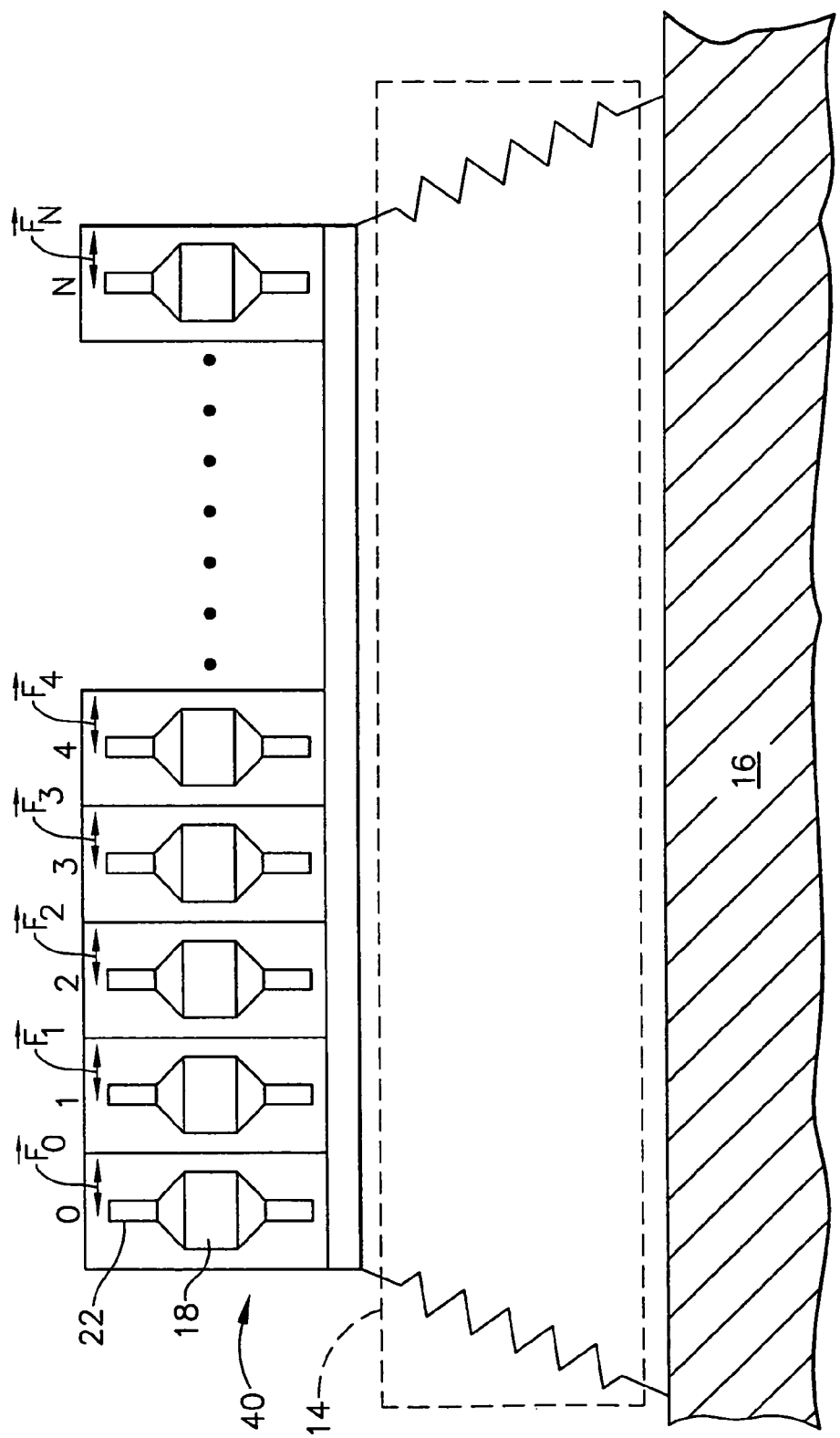
FIG. 4 is an exemplary view of a second embodiment of the present invention in which an array of interconnected stationary housings is mounted on a surface via an isolation subsystem.

Referring now to FIG. 4, a second embodiment of the present invention will now be discussed. A plurality of stationary housings 40, each with a respective rotor 18 and a respective set of electromagnets 22, is interconnected as an array of N stationary housings 40 mounted on the spacecraft surface 16 via the isolation subsystem 14. The stationary housings 40 are relatively light in weight in comparison to the rotors 18. As discussed above, the electromagnets 22 apply a control vector force by pushing or pulling on the trunnion 26. However, the electromagnets 22 also apply an opposite vector force to the stationary housing 12 while applying the control vector force to the trunnion 26. A single stationary housing 12 may not provide sufficient mass for the electromagnets 18 to push or pull against. Therefore, by interconnecting the system 10 with an array of stationary housings 40, each of the electromagnets 22 will have sufficient mass to push or pull against. The isolation subsystem 14 prevents disturbance forces due to, for example, ripple or rotor imbalance as discussed above. The control force [$F_1$, $F_2$, $F_3$ ... $F_N$] to be applied by each respective magnetic bearing 18 is determined in accordance with Formula (1) for each of the array of stationary housings 40 and each corresponding rotor 18. Time domain or other excitation and sensing methods could be used rather than the transfer function measurements resulting from the test forces. Taking appropriate averages of the measurements using Fourier transforms could then create the transfer functions.

Two primary conditions must be satisfied for determining an accurate control force. A bandwidth of the active member 18 must be less that the break frequency of the isolation subsystem 14 by a predetermined ratio and the structural modes of the mounting surface 16 must be greater than the structural modes of the isolation subsystem 14 also by the predetermined ratio. The predetermined ratio depends on the type of isolation subsystem 14. For example, if the isolation subsystem 14 includes a plurality of D-struts®, the predetermined ratio is four. Therefore, the structural modes of the mounting surface 16 would have to be four times greater than the structural mode of the plurality of D-struts®. However, the predetermined ratio could be eight or higher for a non-D-strut® isolation subsystem 14.

Figure 5:
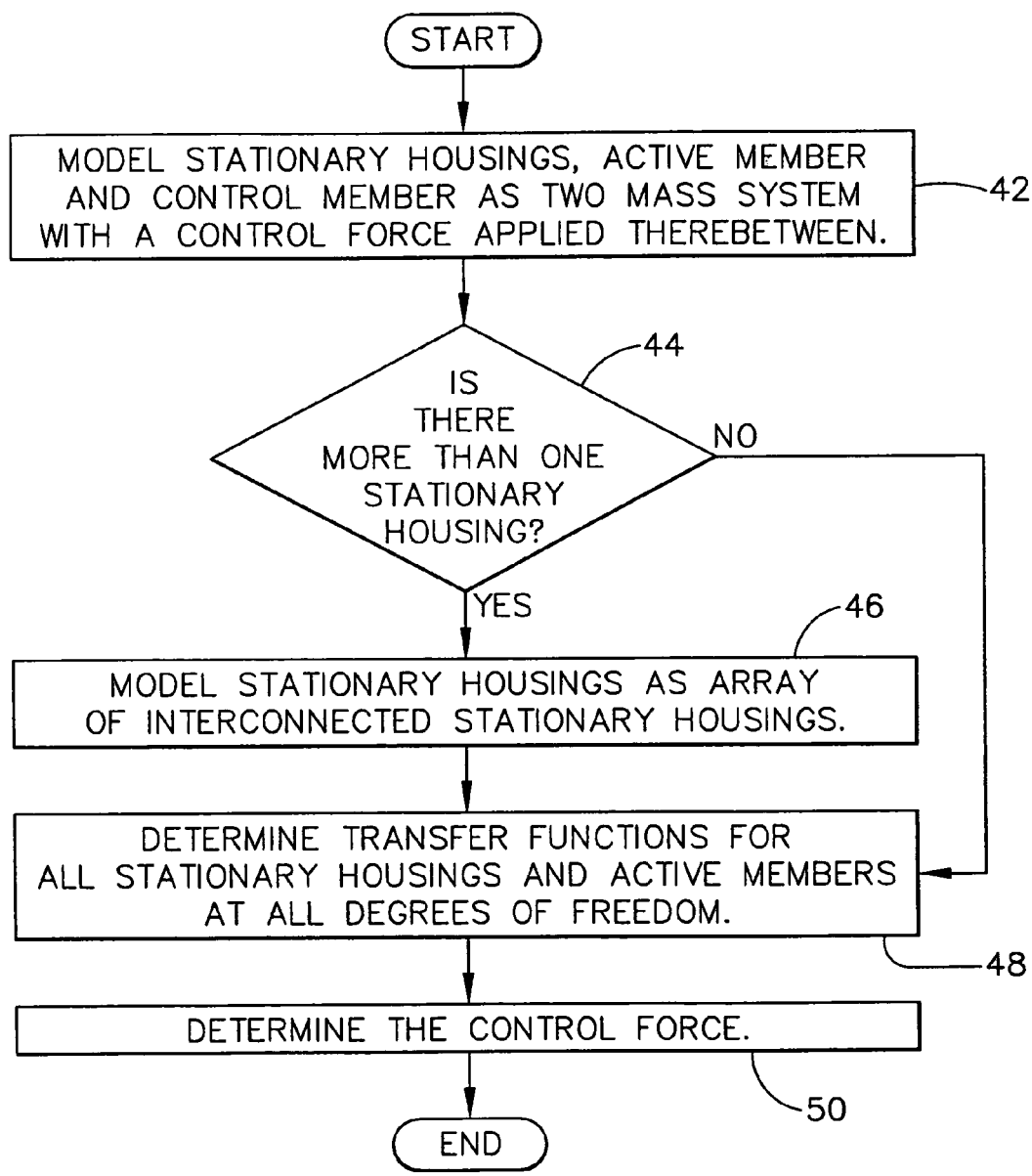
FIG. 5 is a flow diagram of the methodology of the present invention.

The methodology of the present invention will now be discussed with reference to the exemplary system 10 of FIG. 1 and the flow diagram of FIG. 5. At 52, the stationary housing 12, the rotor 18 within the stationary housing 12 and the actuator 22 are modeled as a two mass system in which an inner active member, such as the rotor 18, moves in a direction opposite from an outer housing, such as the stationary housing 12, and a control force is applied between the inner active member and the outer housing. The model could be designed by, for example, a software simulation package. At 54, it is determined whether the system 10 includes more than one stationary housing 12. If the system 10 includes more than one stationary housing 12, at 56 a plurality of stationary housings are modeled as an array of stationary housings (such as stationary housings 40 shown in FIG. 4). The array of stationary housings 40 can be modeled as being, for example, bolted together. At 58, transfer functions are determined for all stationary housing models 12 and each rotor model 18 within the stationary housing at all degrees of freedom in which the control force would be applied (the axes of the control force vector). At 60, the control vector force is determined by applying Formula (1) for each axis to limit the velocity of displacement of each rotor 18 (modeled as an inner active member). The stationary housing 12 (or array of stationary housings 40) is then mounted on an isolation subsystem 14 such as, for example, the D-struts 28 at six degrees of freedom. Conventional control methods can then be used to optimize system controls based upon the determined control vector force.

The methodology of the present invention is not limited to the system 10 that includes the spacecraft surface 16 or the rotor 18. The present invention could be applied to any system involving two masses in which the first mass is freely suspended, the second mass is essentially ground and an active control system controls the freely suspended mass. Another example of such a system is an array of energy wheels mounted to a spacecraft for providing energy storage.

While the above description is of the preferred embodiment of the present invention, it should be appreciated that the invention may be modified, altered, or varied without deviating from the scope and fair meaning of the following claims.

The invention claimed is:

1. A method of estimating dynamics of a structural system, comprising:
    interconnecting a plurality of subsystems together as a housing subsystem, each of the plurality of subsystems including a rotating member;
    mounting the housing subsystem on an isolation subsystem at one or more degrees of freedom for isolating the housing subsystem from a surface subsystem;
    determining one or more transfer functions of interest for the housing subsystem mounted on the isolation subsystem at a plurality of degrees of freedom;
    creating a control force transfer function based on the determining of the one or more transfer functions of interest, the control force transfer function determining a control force applied to the rotating member; and
    wherein the mounting of the housing subsystem on an isolation subsystem at a plurality of degrees of freedom for isolating the housing subsystem from a surface subsystem further comprises mounting the housing subsystem on a hexapod of vibration damping and isolation apparatus that is connected to the surface subsystem.

2. A method of estimating dynamics of a structural system, comprising:

interconnecting a plurality of subsystems together as a housing subsystem, each of the plurality of subsystems including a rotating member;

mounting the housing subsystem on an isolation subsystem at one or more degrees of freedom for isolating the housing subsystem from a surface subsystem;

determining one or more transfer functions of interest for the housing subsystem mounted on the isolation subsystem at a plurality of degrees of freedom; and creating a control force transfer function based on the determining of the one or more transfer functions of interest, the control force transfer function determining a control force applied to the rotating member; and wherein the interconnecting of the plurality of subsystems together as the housing subsystem further comprises defining the housing subsystem as a two-mass subsystem where an active member within the housing subsystem moves in a direction opposite that of an outer housing member of the housing subsystem, and positioning the active member at a predetermined displacement relative to the outer housing.

3. The method of claim 2, wherein the determining of one or more transfer functions of interest for the housing subsystem subsequent to the mounting of the housing subsystem on the isolation subsystem at a plurality of degrees of freedom further comprises determining a transfer function of the active member and a transfer function of the outer housing member.

4. The method of claim 3, wherein the creating of a control force transfer function based on the determining of one or more transfer functions of interest further comprises creating a performance transfer function by applying a transfer function formula for all determined transfer functions of the active member and the outer housing as follows:

$$y/u = -Y^R_y * u - Y^H_y * u,$$

wherein y represents an output velocity, u represents a control force, $Y^R_y$ represents an active member transfer function and $Y^H_y$ represents an outer housing member transfer function.

5. The method of claim 4, wherein the creating of a system performance transfer function based on the determining of one or more transfer functions of interest further comprises creating a performance transfer function by applying a system transfer function for all determined transfer functions of the active member and the outer housing as follows:

$$y/u = -\Sigma Y^R_y * u + \Sigma Y^H_y * u,$$

wherein y represents an output velocity, u represents a control force, $\Sigma Y^R_y$ represents a sum of active member transfer functions at respective degrees of freedom, $\Sigma Y^H_y$ represents a sum of housing member transfer functions at respective degrees of freedom.

6. A method of optimizing performance of a control system comprising:

interconnecting a plurality of rotor housings that each include a rotor and an actuator between the rotor and the rotor housing as one rotor housing;

connecting the one rotor housing to a spacecraft by mounting the one rotor housing to an isolation subsystem at all axes of structural communication between the one rotor housing and the isolation subsystem while preventing structural communication from the one rotor housing to the spacecraft; and determining an actuator transfer function for each actuator of the plurality of rotor housings by applying a system transfer function formula to all transfer functions of the plurality of rotor housings at all degrees of freedom as follows:

$$y/u = -\Sigma Y^R_y * u + \Sigma Y^H_y * u,$$

wherein y represents a velocity of displacement between the rotor and the one rotor housing, u represents a control force, $\Sigma Y^R_y$ represents a sum of rotor transfer functions at respective degrees of freedom, and $\Sigma Y^H_y$ represents a sum of one rotor housing member transfer functions at respective degrees of freedom; and repositioning each of the plurality of rotors to a predetermined position within the respective rotor housing by applying the control force to the rotor via the actuator.

7. The method of claim 6, wherein the connecting the one rotor housing to a spacecraft by mounting the one rotor housing to an isolation subsystem at all axes of structural communication between the one rotor housing and the isolation subsystem while preventing structural communication from the one rotor housing to the spacecraft further comprises:

substantially limiting disturbance forces that occur at frequencies higher than a predetermined rate from communicating with the actuator by a damper element within the isolation subsystem; and permitting attitude control forces that occur at frequencies lower than the predetermined rate to communicate with the actuator by a voice coil within the isolation subsystem.

* * * * *

UNITED STATES PATENT AND TRADEMARK OFFICE
CERTIFICATE OF CORRECTION

| | |
|---|---|
| PATENT NO. | : 7,093,806 B2 |
| APPLICATION NO. | : 10/851975 |
| DATED | : August 22, 2006 |
| INVENTOR(S) | : Osterberg |

It is certified that error appears in the above-identified patent and that said Letters Patent is hereby corrected as shown below:

Column 8, line 3, the formula should read as follows:
$$y/u = -\Sigma Y^R_y * u + \Sigma Y^H_y * u$$

Signed and Sealed this

Tenth Day of April, 2007

JON W. DUDAS
*Director of the United States Patent and Trademark Office*